United States Patent

[11] 3,593,592

[72] Inventor Fredrick J. Adams
    Campton, near Shefford, England
[21] Appl. No. 882,547
[22] Filed Dec. 5, 1969
[45] Patented July 20, 1971
[73] Assignee Cam Gears Limited
    Hitchin, Hulfordshire, England
[32] Priority Dec. 6, 1968
[33] Great Britain
[31] 57988/68

[54] STEERING GEAR
    12 Claims, 4 Drawing Figs.
[52] U.S. Cl. .................................................. 74/498,
                                                    74/422
[51] Int. Cl. ................................................ B62d 3/12
[50] Field of Search .......................................... 74/498,
    422, 583; 188/88.53, 97, 88.502

[56]                References Cited
            UNITED STATES PATENTS
806,684   12/1905   Lemp ........................... 74/498 X
833,230   10/1906   Lemp ........................... 74/498
1,135,923  4/1915   Reynolds ....................... 188/88.502
1,574,601  2/1926   Brundage ...................... 188/91
1,701,007  2/1929   Libani .......................... 188/91
2,913,919 11/1959   Malkiewicz .................... 74/422 X
3,347,109 10/1967   Adams et al. .................. 74/422 X
            FOREIGN PATENTS
946,501    1/1964   Great Britain ................. 74/498

Primary Examiner—Carlton R. Croyle
Assistant Examiner—Thomas C. Perry
Attorney—Hill, Sherman, Meroni, Gross and Simpson ABSTRACT: Rack and pinion steering gear with fluid damping to absorb undesirable feedback from the rack bar to the steering column. The damping may be controlled from a maximum in the median or straight-ahead steering range to a minimum as the two extremities of the steering range are approached.

INVENTOR
FREDERICK JOHN ADAMS
BY Hill, Sherman, Meroni, Gross Simpson
ATTORNEYS

STEERING GEAR

BACKGROUND OF THE INVENTION

1. Field of the Invention

This invention relates to the steering gear art, and particularly to rack and pinion steering, and provides damping means to absorb objectionable or excessive feedback to the steering column. The invention aims to limit the velocity at which undamped feedback forces would be effective to rotate the steering column and in a specific embodiment controls the damping rate from a maximum in the straight-ahead position to a minimum at the extreme turned positions.

2. Description of the Prior Art

In rack and pinion steering assemblies a feedback force from the wheels to the steering column is encountered tending to rotate the steering wheel and requiring restraint by the driver with attendant fatigue. The strain on the driver is most objectionable under straight-ahead, high speed driving conditions, and is least objectionable at the extremities of the driving range where the vehicle will be proceeding slowly.

SUMMARY OF THE INVENTION

This invention now minimizes driver fatigue by damping out feedback forces to the steering column in rack and pinion steering gear. The damping is accomplished by controlling liquid flow between two chambers surrounding the rack bar of the steering gear. The rack bar has piston or plunger means movable therewith to displace the liquid from one to the other chamber. A restricted passage controls the flow between the two chambers. A reservoir for liquid is provided and is connected to the two chambers through one-way valve means which supply makeup liquid to the chambers but prevent back-flow of the liquid from the chambers to the reservoir.

The damping rate may be arranged so as to vary with the momentary position of the steering gear. For example, it may be desirable to provide for maximum damping in the median steering range which is in a range of the total "lock" (extreme left to extreme right) which corresponds nearly to "straight wheel" or neutral steering, with diminishing damping as the two extremities of the range are approached. When steering at a near maximum lock position (extreme right or left), a driver is not likely to be upset by a steering wheel reaction or "feedback" because he must in the very nature of driving be proceeding slowly in such extreme steering positions.

It will be understood, however, that the present invention is not dependent upon the provision of graduated damping, but is concerned with damping in rack and pinion steering which may be economically and simply provided and which has its own "topping up" in the event of loss of liquid, and which may also have externally accessible adjustment of damping.

It is then an object of this invention to provide damping means for rack and pinion vehicle steering gear which will absorb objectionable feedback to the steering column.

Another object of the invention is to provide rack and pinion steering gear with opposed liquid chambers surrounding the rack bar and means controlling flow of liquid between said chambers, together with piston means movable with the rack bar in said chambers to displace liquid from one chamber to the other as the rack bar is shifted.

Another object of this invention is to provide a liquid dampener for rack and pinion steering.

Another object of this invention is to provide a rack and pinion vehicle steering gear which will damp out feedback forces from the steering wheels to the steering column in a controlled manner with a maximum effect in the straight-ahead position diminishing to a minimum effect in the extreme steering positions.

A specific object of this invention is to provide a rack and pinion steering gear with a rack bar slidable through a housing and carrying pistons sealing against the housing which displace liquid through a damping passage as the rack bar is shifted, thereby minimizing feedback forces to the steering column.

Other and further objects of this invention will be apparent to those skilled in this art from the following description of the annexed sheets of drawings which, by way of preferred examples only, illustrate several embodiments of the invention.

BRIEF DESCRIPTION OF THE DRAWINGS

FIG. 2a is a fragmentary longitudinal cross-sectional view showing a further alternate arrangement functionally resembling the arrangement of FIG. 1, but only having one piston and two seals.

DESCRIPTION OF THE PREFERRED EMBODIMENTS

Figure 1:
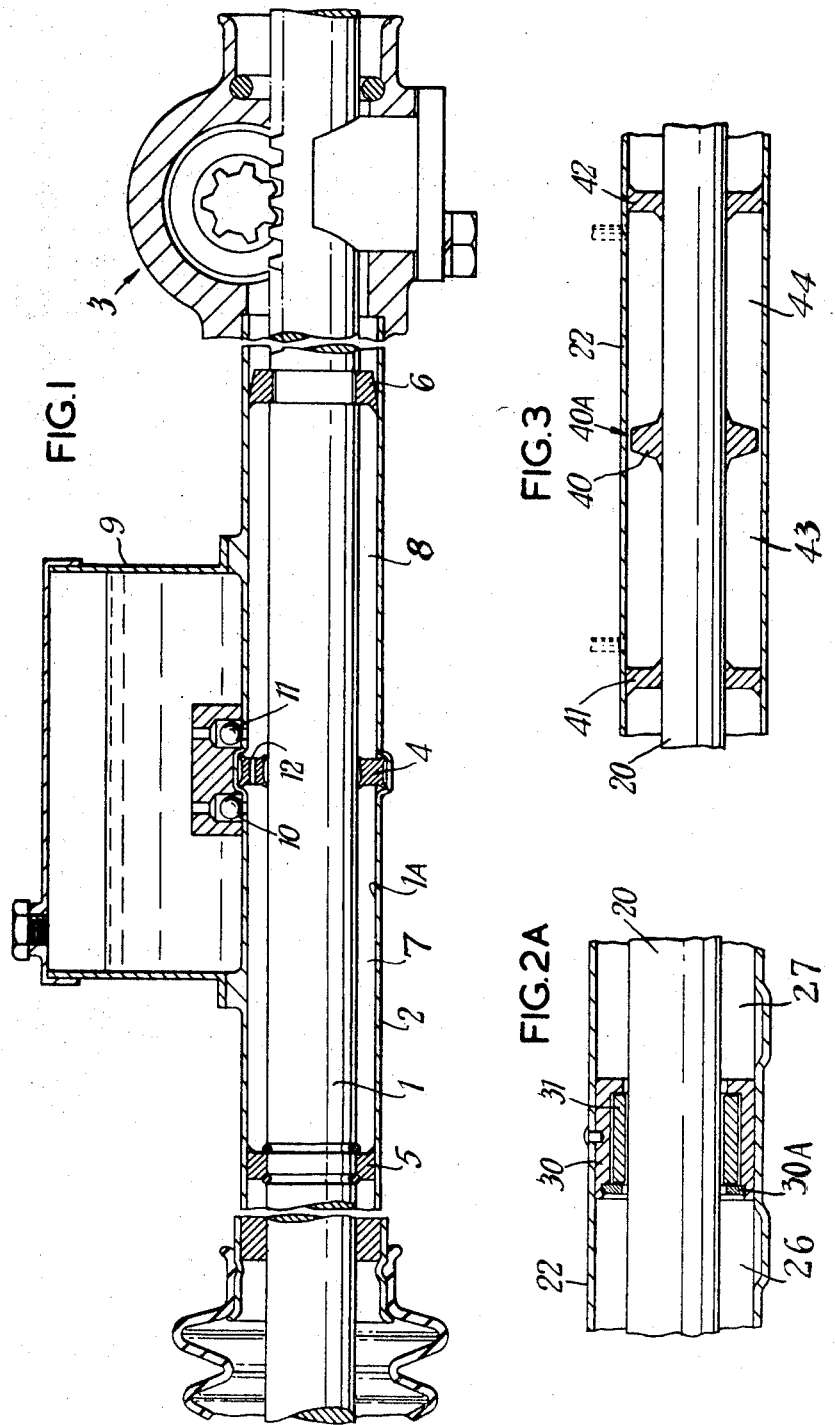
FIG. 1 is a longitudinal cross-sectional view of a rack and pinion assembly according to this invention and having an integral liquid reservoir.

In FIG. 1 is seen a rack bar 1, sliding in a cylindrical housing 2 and operated by the rack and pinion mechanism shown generally at 3. The cylindrical housing 2 has fixed in it an annular seal at 4 through which slides the bar 1. On the bar 1 are mounted two piston elements 5, 6, which slide operable in the housing 2; the piston 5 and seal 4 enclose a pressure chamber 7, and piston 6 and seal 4 enclose a chamber 8. On the housing 2 is carried a chamber 9 for liquid. This communicates with the chambers 7 and 8, by nonreturn ball valves 10, 11, of which the balls are preferably buoyant so that they tend to assume a closed position. Through the seal 4 is provided a damping passage 12 which controls the leakage of liquid between the chambers 7 and 8. The valves 10, 11 ensure that the chambers are kept full of liquid from the reservoir 9. When the bar 1 is moved (for example) from left to right, liquid is displaced from chamber 7 into chamber 8 through the passage 12, which passage damps the flow according to its rate. Sudden movements are thereby checked.

Figure 2:
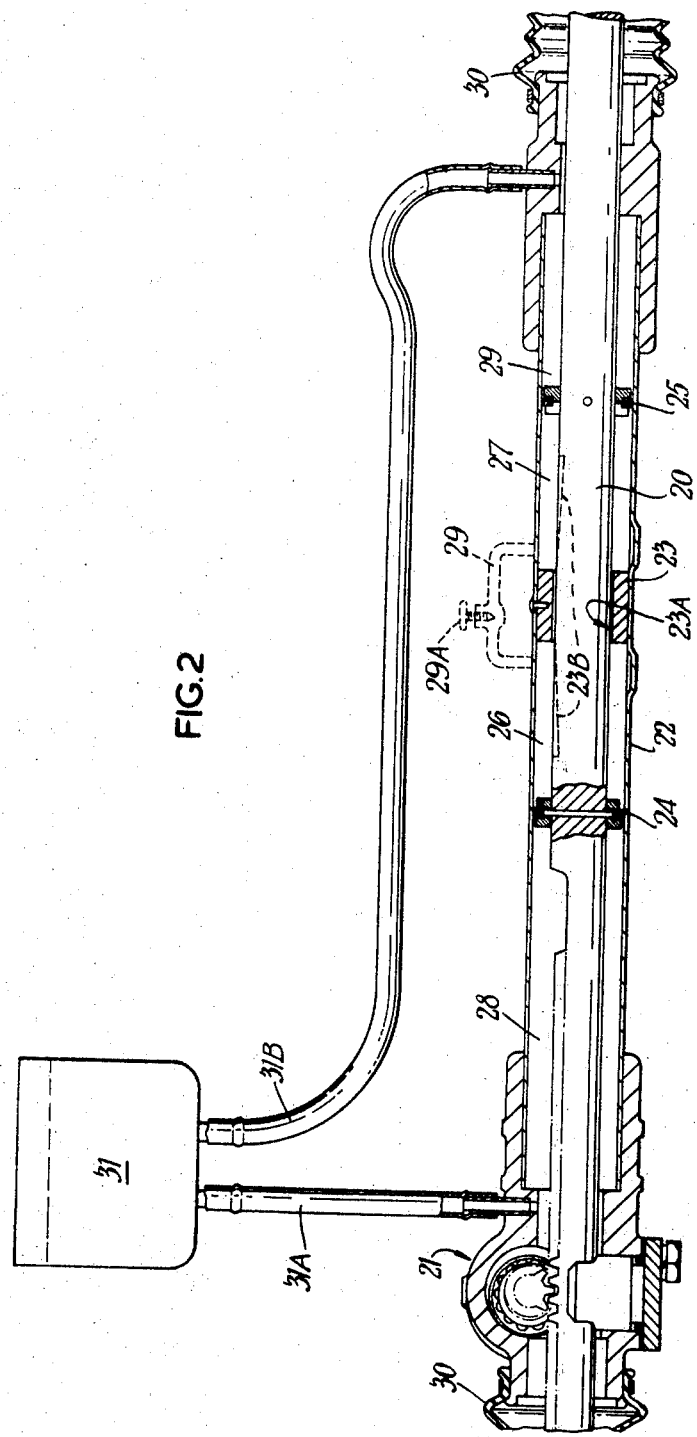
FIG. 2 is a view similar to FIG. 1 showing an alternate arrangement where the liquid reservoir is remotely located, and also illustrating in dotted line an externally accessible damping passage.

In FIG. 2 the rack bar 20 is actuated by the rack and pinion indicated at 21, and it slides within the cylindrical housing 22. In this is fixed a seal 23 in the form of a bush fixed in the casing and having a sliding clearance at 23A forming the damping passage. The bar 20 has fixed on it two unidirectionally operable pistons 24, 25, which with the seal 23 define annular pressure spaces 26, 27. On the outer sides of the pistons 24, 25 and between them and the ends of the bar are chambers 28, 29 which are closed at the remote ends of the housing 22 by flexible bellows 30 in known manner. The chambers 28, 29, which are to contain negligible pressure, are kept supplied with liquid from a reservoir 31 by pipes 31A, 31B. Thus, any deficiency of liquid in chambers 27, 28 is made good from the reservoir by liquid unidirectionally passing the pistons: the pistons in this function, act like nonreturn valves.

Referring also to FIG. 2, there are illustrated at 23B in dotted lines, longitudinal channels or grooves in the rack bar 20 or progressively increasing cross-sectional area downstream from each side of the central or straight-ahead steering position of the rack bar. In this arrangement maximum damping is provided when the steering is near "neutral" or "straight-ahead," and the damping increases with increasing displacement of the rack bar toward end lock positions.

In FIG. 2A an alternate form of seal or damping passage is illustrated. As shown, the cylinder 22 has fixed in it an annular element 30 with an elastic spring ring or retainer 30A retaining a bushing element 31 which has a clearance fit on the rack bar 20 and in the annular element 30. The total clearance is selected to provide the damping passage. This arrangement allows for misalignment of the rack bar in the cylindrical housing 22.

In FIG. 2 a further damping passage arrangement is shown in broken lines. As there shown, the seal between the two chambers 26 and 27 is assumed to have a close fit on the rack bar 20, allowing little or no leakage therethrough (i.e., the clearance at 23A will not be present). Externally there is connected to the chambers 26 and 27 a bypass pipe 29 interconnecting the chambers. A readily accessible adjusting screw 29A is provided in this bypass pipe 29 to control flow therethrough and thus regulate the damping. The damping orifice controlled by the adjusting screw 29A could, if desired, be controlled by fluid pressure derived from or related to an actuating pressure of a power-assisted steering system.

In FIG. 3, the bar 20 of FIG. 2 carries only one double-acting piston 40, sliding in the cylinder 22 between two unidirectional annular seals 41, 42 which are fixed in the cylinder. The piston 40, and seals 41, 42 enclose pressure chambers 43, 44, which have the same functions as 27, 28 in FIG. 2. The piston 40 is a clearance at 40A fit in the cylinder 22, thus providing the damping passage.

Relief valving means may be provided to avoid excessive pressures in the chambers. This may be achieved by using a spring-loaded two-way valve, arranged to follow a selected valve law, as the damping orifice, so that relieved fluid either crosses to the lower pressure chamber or goes to the reservoir.

From the above descriptions it will, therefore, be understood that this invention now limits feedback forces from rack and pinion steering gear to the steering column to relieve driver fatigue without, however, losing steering "feel" or impeding steering action.

I claim:

1. In a rack and pinion vehicle steering gear including a rack bar having a rack, a pinion meshed with the rack for longitudinally shifting the rack bar and a housing surrounding the rack bar, the improvement of means for damping feedback forces from the rack bar to the pinion including opposed pressure chambers in the housing surrounding the rack bar, piston means moving with the rack bar to displace liquid between the chambers, and a damping passage connecting the chambers for controlling liquid flow therebetween.

2. The rack and pinion gear of claim 1 including a liquid reservoir connected to each chamber for maintaining liquid in the chambers.

3. The rack and pinion steering gear of claim 2 in which the reservoir is connected to each chamber through a one-way valve.

4. The rack and pinion steering gear of claim 2 in which the reservoir is connected to each chamber by a one-way passage through unidirectionally operating pistons on the rack bar.

5. The rack and pinion steering gear of claim 1 including a reservoir for liquid mounted on the housing and connected to the pressure chambers through one-way valves.

6. A rack and pinion vehicle steering gear assembly comprising a tubular housing, a rack bar slidable through said housing, longitudinally spaced pistons secured on said rack bar sealingly engaging said housing and providing a sealed chamber therebetween surrounding the rack bar, seal means dividing said chamber into two compartments and having a damping passage connecting the compartments, means for maintaining said chamber filled with liquid, and a pinion shifting said rack bar in said housing to displace liquid from one compartment to the other through said passage whereby feedback forces on the rack bar to the pinion will be damped.

7. The rack and pinion gear of claim 6 wherein the seal means is fixed to the housing and has a passageway therethrough.

8. The rack and pinion gear of claim 6 wherein the seal means is fixed to the rack bar and the pistons are fixed to the housing.

9. The rack and pinion gear of claim 1 including means on the rack bar effective to vary the size of the damping passage as the rack bar is shifted to vary the damping rate.

10. The steering gear of claim 1 wherein the damping passage is in a bypass duct external to the housing and has an externally accessible control for adjusting the size of the passage.

11. The rack and pinion gear of claim 1 wherein the rack bar has grooves of increasing cross-sectional area extending from opposite sides of the damping passage to increase the damping passage as the rack bar is shifted towards the extremities of its operating positions.

12. The steering gear of claim 1 wherein the damping passage includes a movable bushing accommodating misalignment of the rack bar and housing without substantially affecting the damping action.

UNITED STATES PATENT OFFICE
CERTIFICATE OF CORRECTION

Patent No. 3,593,592      Dated July 20, 1971

Inventor(s) FREDERICK JOHN ADAMS

It is certified that error appears in the above-identified patent and that said Letters Patent are hereby corrected as shown below:

Column 2, lines 15-18, cancel "FIG. 2a is a fragmentary longitudinal cross-sectional view showing a further alternate arrangement functionally resembling the arrangement of FIG. 1, but only having one piston and two seals." and insert:

--Figure 2a is a fragmentary longitudinal cross-sectional view showing an alternate form of damping means for the assembly;

Figure 3 is a fragmentary longitudinal cross-sectional view showing a further alternate arrangement functionally resembling the arrangement of Figure 1, but only having one piston and two seals.--

Column 2, line 57, cancel "or" and insert --of--.

Signed and sealed this 22nd day of February 1972.

(SEAL)
Attest:

EDWARD M. FLETCHER, JR.
Attesting Officer

ROBERT GOTTSCHALK
Commissioner of Patents